United States Patent [19]

Allen et al.

[11] 4,224,651
[45] Sep. 23, 1980

[54] MONITORING A SIGNAL

[76] Inventors: James C. H. Allen; Tobias D. Schonken; Johan C. Botma, all of P.O. Box 115, Rosslyn 0200, Pretoria, Transvaal Province, South Africa

[21] Appl. No.: 886,228

[22] Filed: Mar. 13, 1978

[30] Foreign Application Priority Data

Mar. 14, 1977 [GB] United Kingdom ............... 10744/77

[51] Int. Cl.² .............................................. H02H 3/08
[52] U.S. Cl. ......................................... 361/28; 361/97
[58] Field of Search ..................... 361/28, 29, 94, 96, 361/97

[56] References Cited

U.S. PATENT DOCUMENTS

| | | | |
|---|---|---|---|
| 3,440,491 | 4/1969 | Tenenbaum et al. | 361/94 X |
| 3,609,461 | 9/1971 | Obenhaus | 361/94 |
| 3,766,436 | 10/1973 | Zocholl | 361/94 |
| 3,831,061 | 8/1974 | Boyd | 361/94 |
| 4,012,669 | 3/1977 | Gelfand et al. | 361/97 |

OTHER PUBLICATIONS

"MJE 200 Series Linearized Current Monitor"–M. J. Electronics, Sep. 1976.

Primary Examiner—Harry E. Moose, Jr.
Attorney, Agent, or Firm—Ladas & Parry

[57] ABSTRACT

A method of and a protection relay for protecting electrical equipment. The method includes dividing a predetermined dividend value by a signal corresponding to the load current in the equipment to provide a quotient signal, and then linearly integrating the quotient signal. When the integrated signal reaches a predetermined value, the equipment is tripped. This provides an overload vs tripping time characteristic which is substantially linear. The method further provides for sensing whether the equipment is operating in a start up mode or in a normal running mode, and then automatically to select a less sensitive overload vs tripping time characteristic when the equipment operates in the start up mode and automatically to switch to a more sensitive characteristic when the equipment reverts to its normal running mode.

18 Claims, 8 Drawing Figures

MONITORING A SIGNAL

This invention relates to a method of and a monitoring device for monitoring a signal such as, for example, a signal corresponding to the load current in electrical equipment. More particularly, it relates to a method of and a protection relay for protecting such equipment.

According to one aspect of the invention there is provided a method of monitoring an input signal, which comprises generating an output signal at the end of a time delay, the length of the time delay depending substantially linearly on the magnitude of the input signal during the time delay over at least a finite range of magnitudes of the input signal, the higher the magnitude of the input signal, the shorter the time delay.

The method may comprise dividing a predetermined dividend value by the input signal to provide a quotient signal, substantially linearly integrating the quotient signal with respect to time to provide an integrated signal, and generating said output signal when the integrated signal reaches a predetermined value.

Further according to this aspect of the invention there is provided a method of protecting electrical equipment, which comprises obtaining an input signal representative of the degree by which the current flowing in the equipment exceeds a predetermined full load value, monitoring the input signal in accordance with the method described above, and causing said output signal to trip the electrical equipment.

This aspect of the invention extends to a monitoring device for monitoring an input signal, which comprises timing means operative in response to an intermediate signal to generate an output signal at the end of a time delay whereof the length depends non-linearly on the magnitude of the intermediate signal during the time delay, and correcting means operative in response to the input signal to provide said intermediate signal to the timing means, the correcting means having a transfer characteristic which is such that the length of the time delay depends substantially linearly on the magnitude of the input signal during the time delay over at least a finite range of magnitudes of the input signal, the higher the magnitude of the input signal, the shorter the time delay.

The timing means may be in the form of an integrator for substantially linearly integrating said intermediate signal to provide an integrated signal, the monitoring device may include means for generating said output signal when the integrated signal reaches a predetermined value, and the correcting means may be in the form of dividing means for dividing a predetermined dividend value by the input signal to provide as quotient the intermediate signal.

The dividing means may comprise a triangular wave generator for generating a triangular wave signal, a comparator for comparing the triangular wave signal with said input signal, and a feedback amplifier having a feedback loop and being operative to amplify said dividend value to provide said intermediate signal, the feedback loop having switching means operative in response to the comparator to switch the feedback loop into or out of circuit depending on whether the instantaneous value of the triangular wave signal respectively exceeds or is less than the input signal by a predetermined amount.

The switching means may be in the form of a solid state analogue switch.

The monitoring device may further comprise detecting means for detecting when the instantaneous value of the triangular wave signal respectively exceeds or is less than the input signal by said predetermined amount for at least a whole cycle of the triangular wave signal, the detecting means being operatively connected to the means for generating said output signal, thereby, in response to such occurrence, to cause the generation of said output signal.

The detecting means may comprise a counting circuit which is operatively connected to the triangular wave generator for being advanced one count for every cycle of the triangular wave generator, and which is further operatively connected to the output of the comparator for being reset whenever the instantaneous value of the triangular wave signal respectively exceeds or is less than the input signal by said predetermined amount, whereby, when the counter reaches a predetermined count of at least two, the means for generating said output signal is caused to generate said output signal.

This aspect of the invention further extends to a protection relay for protecting electrical equipment, which comprises means for providing an input signal representative of the degree by which the current flowing in the equipment exceeds a predetermined full load value, and a monitoring device as described above, for monitoring the input signal, whereby, in operation, the output signal is capable of being used for tripping said equipment.

The means for providing said input signal may include a high precision rectifier to provide said input signal as a DC signal where said current is an AC current.

According to another aspect of the invention there is provided a method of protecting electrical equipment wherein the current during start up, when the equipment operates in a start up mode, exceeds a predetermined full load value and thereafter drops to a value equal to or less than the predetermined full load value when the equipment operates in a running mode, which method comprises:

obtaining an input signal representative of the degree by which the current exceeds the predetermined full load value;

providing switchable time delay means being switchable between a starting condition and a running condition;

feeding the input signal to the switchable time delay means, the switchable time delay means being operative in each of its said conditions to generate an output signal at the end of a time delay whereof the length depends on the magnitude of the input signal during the time delay, the time delay when the switchable time delay means is in the starting condition being longer than that when it is in the running condition for the same input signal;

sensing whether the equipment operates in the start up or in the running mode;

automatically switching the switchable time delay means to its starting or running condition according to whether the equipment operates in the start up or running mode respectively; and causing said output signal to trip the equipment.

According to this aspect of the invention there is also provided a protection relay for protecting electrical equipment wherein the current during start up, when the equipment operates in a start up mode, exceeds a predetermined full load value and thereafter drops to a value equal to or less than the predetermined full load value, which comprises:

means for providing an input signal representative of the degree by which the current flowing in the equipment exceeds the predetermined full load value;

switchable time delay means operatively connected to the means for providing said input signal and being switchable between a starting condition and a running condition in each of which conditions it is adapted in response to the input signal to generate an output signal capable of being used for tripping said equipment, said output signal being generated at the end of a time delay whereof the length depends on the magnitude of the input signal during the time delay, the time delay when the switchable time delay means is in the starting condition being longer than that when it is in the running condition for the same input signal;

sensing means for sensing whether the equipment operates in the start up or in the running mode; and means operatively connected to the sensing means for automatically switching the switchable time delay means to its starting or running condition according to whether the equipment operates in the start up or running mode respectively.

The switchable time delay means may include a pair of adjustable attenuators, and switching means for selectively connecting one of the adjustable attenuators, according to whether the equipment operates in the start up or running mode, in circuit to attenuate said input signal.

The switching means may be in the form of a pair of solid state analogue switches, each associated with one of the attenuators.

The switchable time delay means may include a monitoring device as described above, the switching means being operative selectively to connect one of the attenuators between the means for providing said input signal and the monitoring device.

Alternatively, the switchable time delay means may include an amplifier connected to the means for providing said input signal, a pair of adjustable attenuators, and switching means for selectively switching one of the attenuators in circuit as feedback element for the amplifier according to whether the equipment operates in the start up or running mode.

The switching means may in this case also be in the form of a pair of solid state analogue switches, each associated with one of the attenuators.

The switchable time delay means includes a monitoring device as described above, operatively connected to the output of the amplifier.

The invention will now be described in more detail, by way of example, with reference to the accompanying drawings.

The values of resistors and capacitors are given in FIGS. 5 to 8 of the drawings. An "L" in a circle denotes a connection to a negative supply rail (at a potential of about −6 v) of the circuit, an "H" in a circle denotes a connection to a positive supply rail (at a potential of about +6 v), and a small triangle with one of its apices pointing downwardly denotes a connection to a centre rail having a potential lying midway between that of the "L" and "H" rails.

The integrated circuits used are of the CMOS integrated circuit family available from, for example, Motorola or RCA. In the drawings the pin members of the integrated circuits are indicated inside the blocks representing the integrated circuits.

Figure 1:
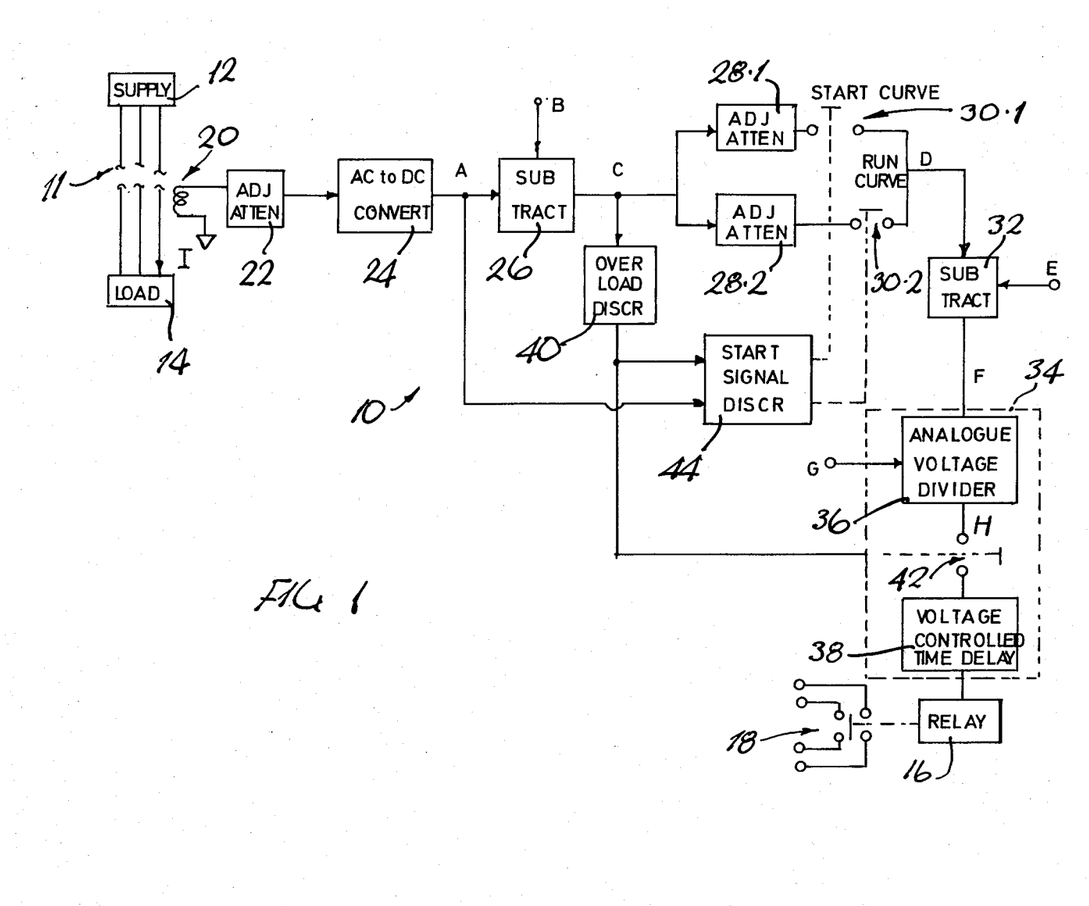
FIG. 1 shows a block diagram of a protection relay in accordance with one embodiment of the invention.

In FIG. 1, reference numeral 10 generally indicates a protection relay for monitoring the load current I flowing via a three-phase feeder 11 from an electrical supply 12 to a load 14. The protection relay device has a trip relay 16 with tripping contacts 18 for tripping a circuit breaker (not shown) in the feeder 11.

An input signal corresponding to the load current I is obtained by means of a current transformer 20 associated with one of the phases of the feeder 11. The input signal is fed via an adjustable attenuator 22 to an AC to DC converter 24 to provide a dc signal A which is substantially directly proportional to the magnitude of the load current I.

The signal A is fed to a first subtracting circuit 26 to provide at its output a signal C which is proportional to the difference between the signal A and a constant value B.

Thus, $C = K1(A - B)$, where K1 is a constant.

The signal C is fed to two adjustable attenuators 28.1 and 28.2, the output of any one of which is, at any one time, connectable via electronic switches 30.1 and 30.2 respectively, to the input of a second subtracting circuit 32 to provide a signal D to the second subtracting circuit. The second subtracting circuit provides at its output a signal F which is proportional to the difference between a constant value E and the signal D.

Thus, $F = K2(E - D)$, where K2 is a constant.

Also, $D = K3(C)$, where K3 is a constant which will depend on which of the adjustable attenuators 28.1, 28.2 has been selected, and on the setting of the selected attenuator.

Thus, $F = K5 - K4 \cdot A$, where $K4 = K1 \cdot K2 \cdot K3$, a constant and $K5 = K4 \cdot B + K2 \cdot E$, a constant.

The signal F is fed to the input of a time delay device 34 which comprises a correcting circuit in the form of an analogue voltage divider 36 connected in series with a timer in the form of a voltage controlled time delay circuit 38. The output of the time delay device is arranged to energise the relay 16, thus to provide a trip signal by means of the relay contacts 18.

The voltage controlled time delay circuit 38 may be a time delay circuit of the conventional type exhibiting a hyperbolic time delay characteristic. Thus, if a voltage H is applied to the input of the circuit 38 it will provide an output signal at its output after a time delay T which is a function of H, mathematically representable as follows:

$$T = f(H) = K6/H$$

where K6 is a constant.

The time delay circuit may also be of the type exhibiting a decaying exponential time delay characteristic. Such a time delay characteristic may, for example, be provided by an R-C circuit and may be represented mathematically as follows:

$$T = f(H) = K7 \cdot e^{-H}$$

where K7 is a constant.

Where the voltage controlled time delay circuit exhibits fairly accurately a hyperbolic time delay characteristic, the correcting circuit may be a simple analogue voltage divider as indicated in the drawings. This will provide from a signal F at its input an intermediate signal H at its output, where H = G/F, G being a constant
T = K6/H = K8.F where K8 = K6/G, a constant
From this it follows that:

$$T = K9 \cdot K10 \cdot A$$

where K9 = K8.K5, a constant, and K10 = K8.K4, a constant.

This represents a time delay characteristic having a constant negative slope K10.

In order to activate the time delay circuit only when the load current exceeds a maximum permissible value, the value of B is chosen to represent the current at maximum permissible load. The signal C will thus be positive only when the current I exceeds this maximum permissible value. An overload discriminator 40 is connected to detect when C becomes positive and then to interconnect the analogue voltage divider 36 to the voltage controlled time delay circuit 38 by means of an electronic switch 42.

The adjustable attenuators 28.1 and 28.2 are individually selectable by means of a start signal discriminator 44. This discriminator receives its inputs respectively from the output of the AC to DC converter 24 and the output of the overload discriminator 40. It is arranged to detect when the current I increases at more than a predetermined rate from zero to a value beyond the maximum permissible current. When this condition prevails it switches the electronic switch 30.1 on and the electronic switch 30.2 off. Whenever the current I is below the maximum permissible value, the discriminator 44 will switch on the electronic switch 30.2 and switch off the electronic switch 30.1.

Figure 2:
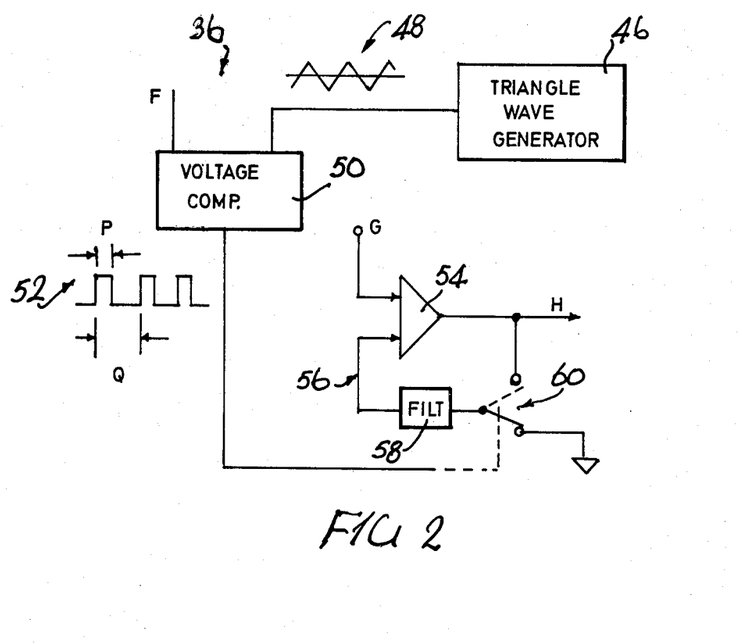
FIG. 2 shows a block diagram of an analogue voltage divider forming part of the protection relay of FIG. 1.

The analogue voltage divider 36 is shown in more detail in FIG. 2. It comprises a triangular wave generator 46, the output of which (graphically shown at 48), together with the signal F, are fed to a voltage comparator 50. The voltage comparator is arranged to provide at its output a square wave signal (graphically shown at 52), which goes high whenever the value of the triangular wave exceeds the value of F, giving a duty cycle P/Q which decreases linearly as F increases.

The analogue voltage divider 36 further comprises an amplifier 54 with a switchable negative feedback loop 56 having a filter 58. The feedback loop 56 is interrupted by an electronic switch 60 actuated by the output of the voltage comparator. Thus, when F is high and the duty cycle P/Q accordingly low, the feedback loop 56 is switched in circuit most of the time, giving a low output signal H. Conversely, if F is low and the duty cycle P/Q accordingly high, the feedback loop 56 is switched out of circuit most of the time, giving a high output signal H. Between limits, the output signal H will approximately have the value $$H = G/F$$

Time delay characteristics 62 obtainable by the circuit described above are plotted in FIG. 3. The time delay is marked off in seconds on the x-coordinate, and the number of times the load current exceeds the normal full load current is marked off on the y-coordinate. The slope of the characteristics between zero time delay and a time delay of 100 seconds is adjustable by adjusting the attenuators 28.1 and 28.2 (see FIG. 1). Thus, two different characteristics may be selected on the two attenuators 28.1 and 28.2.

Figure 3:
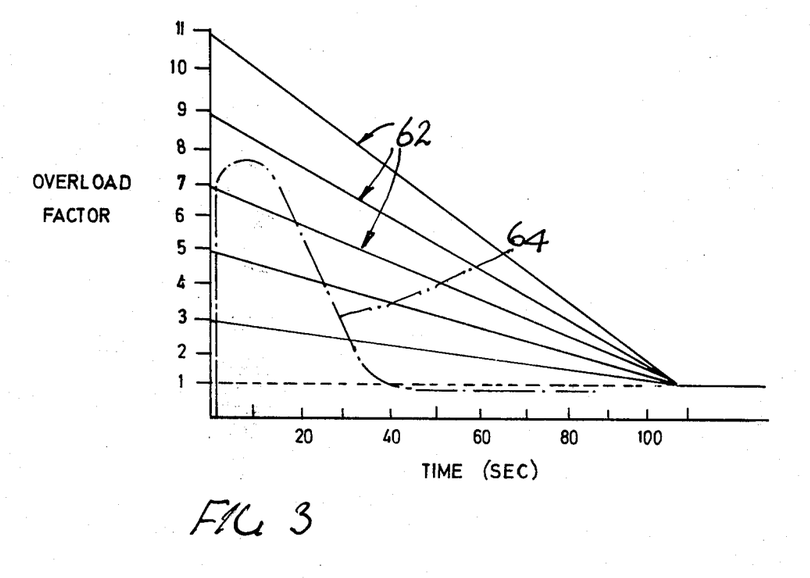
FIG. 3 is a graph (shown by a chain-dotted line) of the starting current of an electric motor plotted against time, with timing curves (solid lines) of the protection relay superimposed thereon.

At 64 there is shown a typical starting current curve of an electric motor. Upon switch-on the current according to this curve rapidly increases to about 8 or 9 times the full load current and then drops down to a value less than full load current.

To protect such a motor, the attenuator 28.1 is set to select a characteristic which gives zero time delay at about 9 or 10 times the maximum permissible load current. The attenuator 28.2 is set to select a characteristic which gives zero time delay at, say, 2 or 3 times the maximum permissible load current.

Referring again to FIG. 2 of the drawings, the voltage comparator 50 may alternatively be arranged to provide at its output a square wave signal which goes high whenever the value of F exceeds the value of the triangular wave, giving a duty cycle P/Q which increases linearly as F increases. The electronic switch 60 will then be operated in the phase opposite to that described above.

Figure 4:
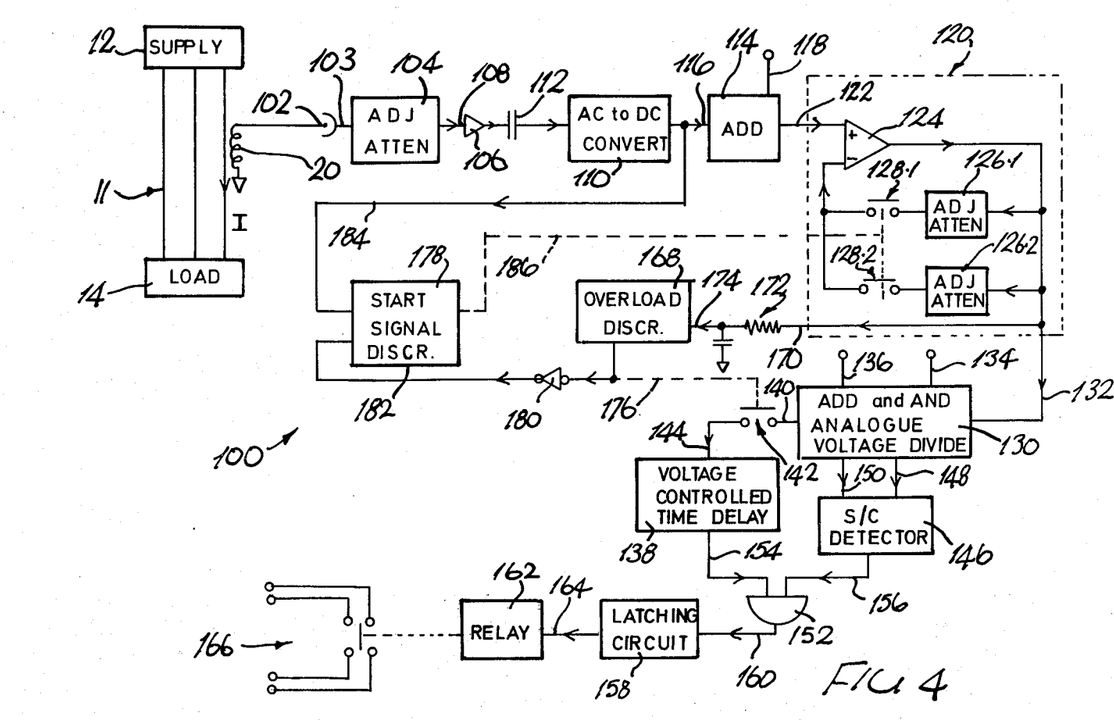
FIG. 4 shows a block diagram of a protection relay in accordance with a slightly different embodiment of the invention.

Referring now to FIG. 4, there is shown a protection relay 100 which has an input terminal 102 whereby, like the monitoring device 10 of FIGS. 1 to 3, it is connectable to a current transformer 20 associated with one of the phases of a three phase feeder 11 interconnecting a supply 12 to a load 14. The protection relay 100 comprises:

an adjustable attenuator 104 connected to the input terminal 102 via a connection 103;
a buffer amplifier 106 connected to the adjustable attenuator 104 via a connection 108;
an AC to DC converter 110 connected to the buffer amplifier 106 via a DC isolating capacitor 112;
an adding circuit 114 connected to the AC to DC converter 110 via a connection 116 and to which a signal to be added is fed via a connection 118;
an adjustable feedback amplifier 120 connected to the adding circuit 114 via a connection 122, and comprising a forward loop amplifier 124, a pair of adjustable attenuators 126.1 and 126.2 which are each selectively switchable in circuit as feedback element by means of electronic switches 128.1 and 128.2 respectively;
a combined adding and analogue voltage dividing circuit 130 connected to the adjustable feedback amplifier 120 via a connection 132, to which a signal to be added is fed via a connection 134 and to which a signal to be used as a dividend is fed via a connection 136;
a voltage controlled time delay circuit 138 connected to the combined adding and analogue voltage dividing circuit 130 via a connection 140, an electronic switch 142, and a connection 144;

a short circuit detecting circuit 146 connected to the circuit 130 via two connections 148 and 150;

an OR-gate 152 having its one input connected to the output of the circuit 138 via a connection 154 and its other input to the short circuit detecting circuit 146 via a connection 156;

a latching circuit 158 connected to the output of the OR-gate 152 via a connection 160;

a trip relay 162 connected to the latching circuit 158 via a connection 164 and having tripping contacts 166 which can be utilised to trip a circuit breaker (not shown) in the feeder 11;

an overload discriminator 168 connected to the output of the adjustable feedback amplifier 120 via a connection 170, an R-C smoothing circuit 172, and a connection 174, and having its output connected to the electronic switch 142 via a connection 176; and a start signal discriminator 178 having one of its inputs connected to the output of the overload discriminator 168 via an inverter 180 and a connection 182, and having its other input connected to the output of the AC to DC converter 110 via a connection 184, the output of the start signal discriminator 178 being connected to the electronic switches 128.1, 128.2 via connections 186 (as will be seen later, there are two connections 186, one for each of the electronic switches 128.1 and 128.2).

Figure 6:
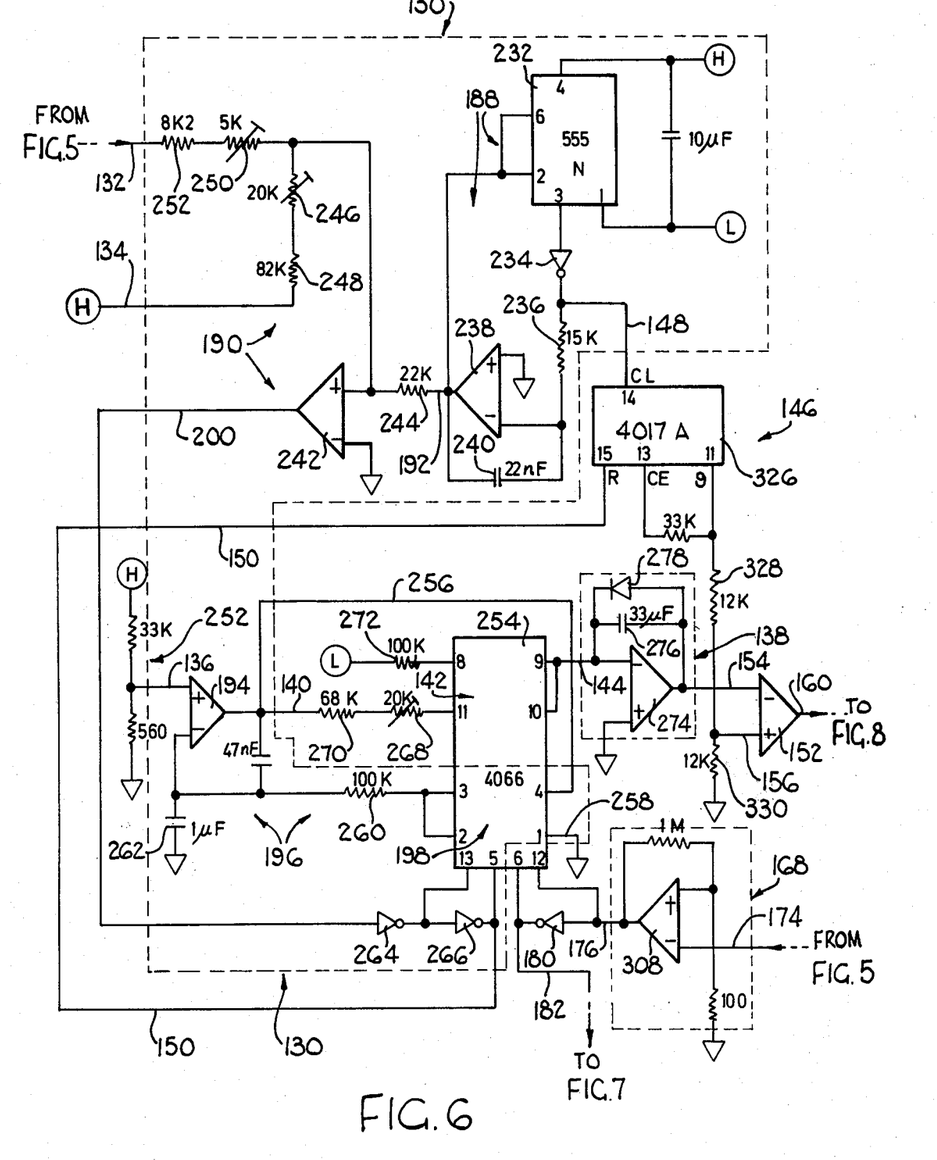
Figure 7:
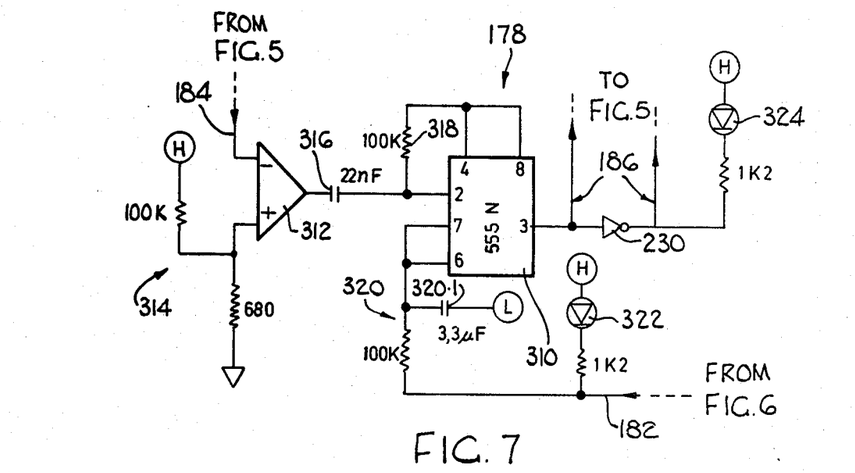

As will be seen in FIG. 6, the combined adding and analogue voltage dividing circuit 130 comprises:

a triangular wave generator 188;

a voltage adder and comparator 190 which has three inputs, one of which is connected to the output of the triangular wave generator 188 via a connection 192, a second of which is the connection 134 referred to above, and the third input of which is connected to the output of the adjustable feedback amplifier 120 via the connection 132; and an operational amplifier 194 with a switchable negative feedback loop having a low pass filter 196 and an electronic switch 198, the electronic switch 198 being operable by the output of the voltage adder and comparator 190 via a connection 200.

The positive input of the amplifier 194 is connected to a fixed reference voltage via the connection 136, and the output thereof is connected to the electronic switch 142 via the connection 140.

The circuit will now be described in more detail with reference to FIGS. 5 to 8.

The adjustable attenuator 104 (FIG. 5) comprises a shunt resistor 202 for the current transformer 20, and a variable resistor 204. The variable resistor 204 is graduated with markings indicating the current which will be considered by the device as full load current.

Figure 5:
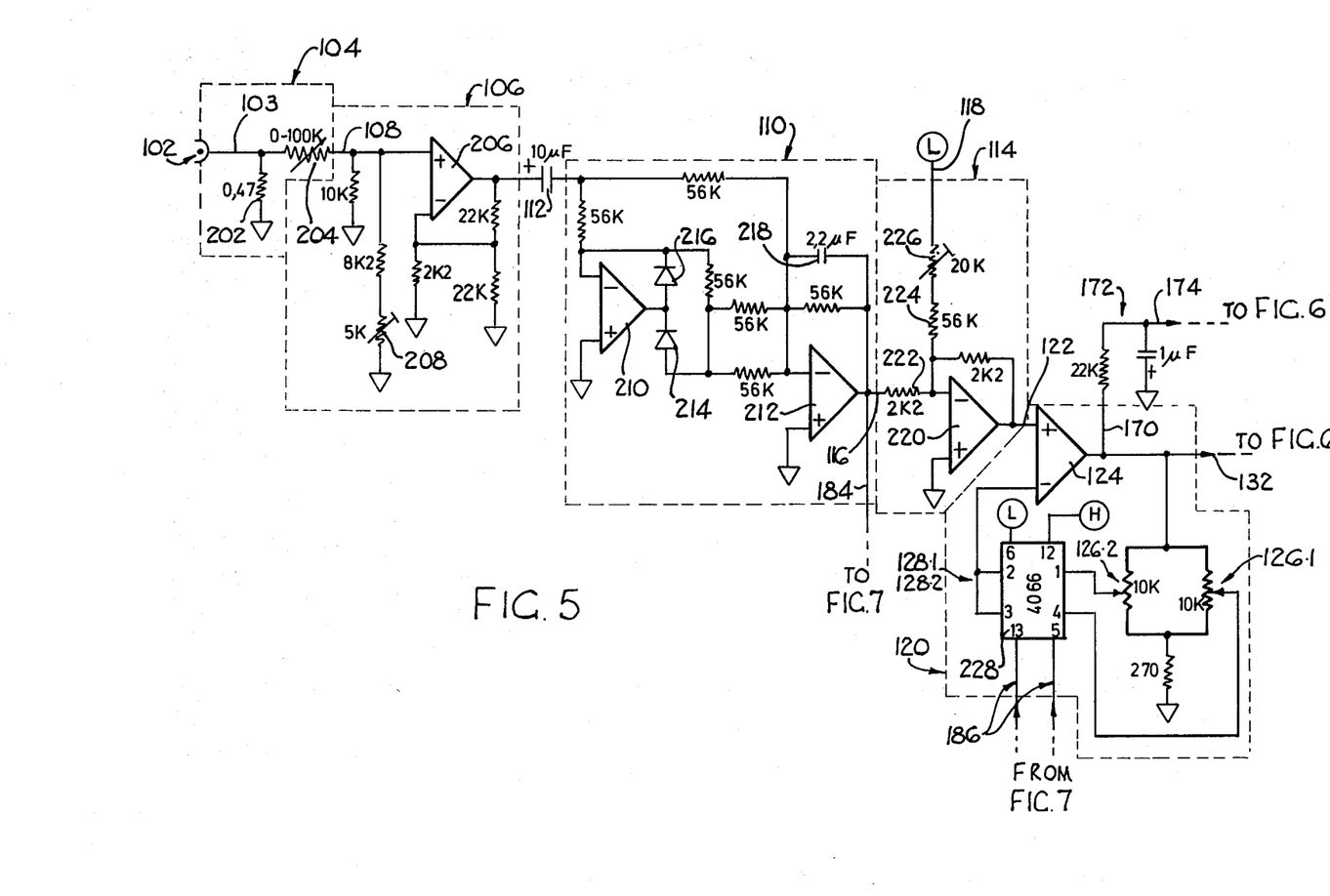
FIGS. 5 to 8 are more detailed circuit diagrams each showing part of the protection relay of FIG. 4.

The buffer amplifier 106 comprises an operational amplifier 206 which is connected to have a predetermined gain which can be preset by means of a preset resistor 208.

The AC to DC converter 110 comprises a pair of operational amplifiers 210 and 212 and a pair of diodes 214 and 216 which are connected in a manner known per se to form a high precision full wave rectifier. The rectifier is termed 'high precision' because it is able to rectify very small voltages, unlike an ordinary rectifier which, if it makes use of silicon diodes, is not able to pass voltages of less than about 0.6 V. The AC to DC converter 110 also includes a capacitor 218 having a capacitance which is sufficiently high to smooth the rectified output of the rectifier.

The preset resistor 208 is set such that, when full load current, as set on the variable resistor 204, flows from the supply 12 to the load 14, the output of the AC to DC converter 110 is about 200 mV.

The adding circuit 114 comprises an operational amplifier 220 having its negative input connected to the connection 116 via a resistor 222, and to the negative rail via resistors 224 and 226. The resistor 226 is a preset resistor. Accordingly, the adding circuit 114 will add a fixed negative reference voltage, the magnitude of which will depend on the setting of the preset resistor 226, to the output of the AC to DC converter 110, and invert the resulting sum.

In the adjustable feedback amplifier 120 the adjustable attenuators 126.1 and 126.2 are each in the form of a potentiometer, and the electronic switches 128.1 and 128.2 are in the form of a 4066 integrated circuit 228. This is a four channel analogue switch only two channels of which are utilised. The sliders of the potentiometers 126.1 and 126.2 are respectively connected via the electronic switches 128.1 and 128.2 to the negative input of the operational amplifier 124. The two control terminals of the electronic switches 128.1 and 128.2 are, as will be seen in FIG. 7, interconnected via the connections 186 by means of an inverter 230, so that, when one of the switches 128.1, 128.2 is switched off the other one will be switched on, and vice versa.

The triangular wave generator 188 (FIG. 6) comprises a 555N integrated circuit 232, an inverter 234, a resistor 236, an operational amplifier 238, and a capacitor 240 connected as shown in the drawing to provide a free running oscillator producing a triangular wave of a frequency of about 1.2, Hz on its output, ie the connection 192. The wave form of this output is as that shown graphically at 48 in FIG. 2.

The voltage adder and comparator circuit 190 (FIG. 6) comprises an operational amplifier 242 having its positive input connected via a resistor 244 to the connection 192, via resistors 246 and 248 to the connection 134, and via resistors 250 and 252 to the connection 132. The connection 134 is connected to the positive rail to provide a fixed reference voltage. The resistors 246 and 250 are preset resistors, permitting adjustment of the circuit.

Because of inversion by the amplifier 220, the effect of the adder and comparator circuit 190 will be to provide the difference between a fixed value (depending on the setting of the preset resistor 246) and the output voltage of the amplifier 124, and to compare this difference with the output of the triangular wave generator 188, ie on its connection 192. When the difference is less than the output of the triangular wave generator 188, then the output of the amplifier 242 will switch to a low value, whereas if the difference is more than the output of the triangular wave generator, it will switch to a high value. The preset resistors 246 and 250 are set to such a value that when the voltage of the connection 192 is zero and full load current, as set on the variable resistor 204 (FIG. 5), flows from the supply 12 to the load 14, then the voltage on the positive input of the amplifier 242 will be zero. If the load current is below its full load value, the voltage on the positive input of the amplifier 242 will be positive, and if the load current exceeds its full load value, the voltage will be negative.

The fixed reference voltage for the amplifier 194 is provided by a voltage divider 252 connected between the positive and centre rails. This provides a reference voltage of about 100 mV on the connection 136.

The electronic switch 198 is provided by two of the channels of a four channel analogue switch which is in the form of a 4066 integrated circuit 254. Hereby the negative input of the amplifier 194 via the low pass filter 196 can be switched either to the output of the amplifier 194 via a connection 256 or to the centre rail via a connection 258. The low pass filter 196 comprises a resistor 260 and a capacitor 262. To switch the electronic switch 198, the output of the amplifier 242 is connected to the control terminal (pin 13) of that channel which is connected to the connection 258, via the connection 200 and an inverter 264, and the control terminal for the other channel (pin 5) is connected to the control terminal of the first channel via a further inverter 266, thus ensuring that when one of the channels is switched on the other will be switched off and vice versa.

The electronic switch 142 (FIG. 6) is formed by the third and fourth channels of the circuit 254. The third channel is utilised to connect the connection 144 to the connection 140 via resistors 268 and 270, and the fourth channel is utilised to connect the connection 144 to the negative rail via a resistor 272. The connection 176 is connected to the control terminal (pin 12) for the third channel and the control terminal (pin 6) for the fourth channel is connected via the inverter 180 to the control terminal for the third channel to ensure that, when the third channel is switched on, the fourth channel is switched off, and vice versa.

The voltage controlled time delay circuit 138 (FIG. 6) comprises an operational amplifier 274 having a capacitor 276 and a diode 278 connected in parallel as feed back element. It will thus act as an integrator.

The latching circuit 158 (FIG. 8) comprises a bistable multivibrator 280, the set terminal S of which is connected to the connection 160. The Q terminal thereof is connected via an inverter 282, a gating diode 284, a further inverter 286, an R-C smoothing circuit 288, yet a further inverter 290, and a resistor 292, via the connection 164, to the base of a switching transistor 294. A coil 296 of the relay 162 is connected to the collector of the transistor 294. A free wheeling diode 297 is connected across the coil 296 of the relay 162.

Figure 8:
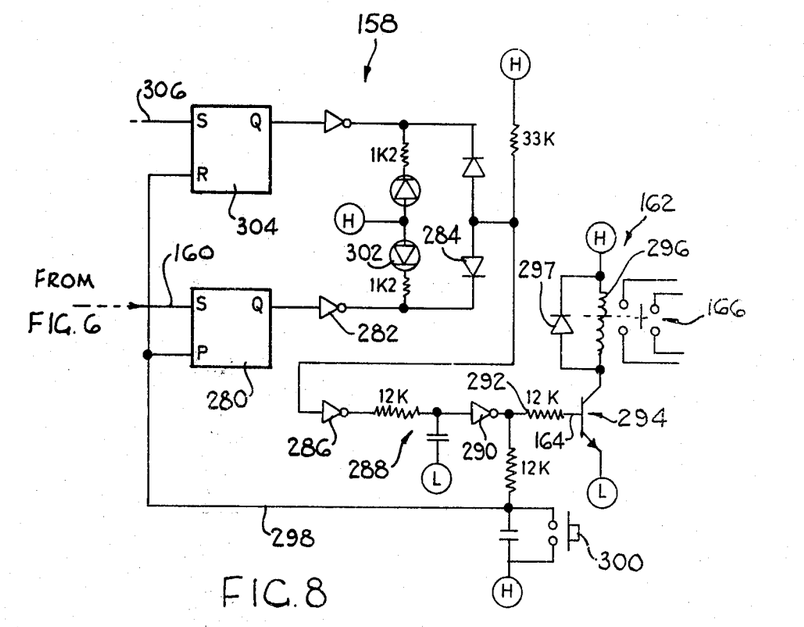

In order to allow the bistable multivibrator 280 to be reset, its reset terminal R is connected by means of a connection 298 to the positive rail via a reset button 300. A light emitting diode 302 is connected to the output of the inverter 282 to provide an indication when the bistable multivibrator 280 is set, ie to indicate that a trip has occurred.

The latching circuit 158 comprises a further bistable multivibrator 304 with associated circuitry for switching and latching the relay 162. This may be used to switch the relay in response, for example, to an unbalance signal fed to the S terminal of the circuit 304 via a connection 306. The circuit for obtaining the unbalance signal does not form part of the present invention and is accordingly not herein described or illustrated.

The overload discriminator 168 (FIG. 6) comprises an operational amplifier 308 which is connected as a Schmitt trigger.

The start signal discriminator 178 (FIG. 7) comprises a 555N integrated circuit 310 and an operational amplifier 312. The connection 184 from the AC to DC converter 110 (FIG. 5) is connected to the negative input of the operational amplifier 312, and the positive input of the operational amplifier 312 is connected to a voltage divider 314 connected between the positive and central rails to provide a reference voltage of about 40 mV. The output of the operational amplifier 312 is connected to the trigger terminal (pin 2) of the circuit 310 via a capacitor 316. Pins 4 and 8 of the circuit 310 are bridged and connected to the pin 2 via a resistor 318. Pins 6 and 7 are bridged and connected via an R-C time delay circuit 320 (providing a time delay of about 300 ms) to the connection 182. A light emitting diode 322 is connected between the positive rail and the connection 182 so as to provide an indication of the existence of an overload condition on the feeder 11. The output of the circuit 310 (pin 3) is connected to one of the lines 186, the two lines 186 being, as mentioned above, interconnected by the inverter 230. A light emitting diode 324 is connected between the output of the inverter 230 and the positive rail so as to give an indication when the device is in the start mode.

The short circuit detector 146 (FIG. 6) comprises a decade counter 326 in the form of a 4017A integrated circuit having its clock terminal CL (pin 14) connected via the connection 148 to the output of the inverter 234 in the triangular wave generator 188. Its '9' terminal (pin 11) is connected to the positive input of the OR-gate 152 via a voltage divider comprising resistances 328 and 330. Its reset terminal R (pin 15) is connected to the output of the inverter 266 via the connection 150.

The operation of the device 100 is basically similar to that of the device 10 shown in FIGS. 1 to 3 and will therefore be discussed very briefly, the emphasis being on the differences.

The AC to DC converter 110 provides at its output a voltage which increases linearly as the current I increases. In the adder circuit 114 a fixed negative voltage is added to this voltage, which is equivalent to subtracting a fixed positive voltage as in the subtracting circuit 26 of the device 10, and in addition the sum is inverted, thus providing an output voltage which is high when the current I is low, drops to zero when the current I is at its full load value, and becomes negative when the current I exceeds its full load value.

The adjustable feedback amplifier 120 has exactly the same function as the adjustable attenuators 28.1 and 28.2 of the device 10, except that the feedback amplifier 120 is able to attenuate as well as to amplify.

The combined adding and analogue voltage dividing circuit 130 differs from that illustrated in FIGS. 1 and 2 in that it combines the subtracting and comparison functions of the circuits 32 and 50 in a single adder and comparator 190. Because the voltage on the connection 132 of the device 100 is an inverted representation of the load current I, the addition of a reference voltage (via connection 134) in the circuit 190 has the same effect as subtraction of the value E in the circuit 32 of the device 10.

Like in the device 10, a square wave signal as indicated at 52 in FIG. 2 will appear on the connection 200. For low load currents the duty cycle P/Q will be high. The preset resistors 246 and 250 will be set such that when the current I drops below full load current, the duty cycle will be 100%. Under these conditions the output of the amplifier 194 will be switched to its negative input all the time thus providing an output voltage on the amplifier 194 equal to the voltage on the input connection 136, ie 100 mV. For a 50% duty cycle the output voltage of the amplifier will be about double, that is 200 mV. For very high load currents the duty cycle will be very low so that the output voltage of the amplifier 194 will be very high. When the duty cycles decreases to less than about 2½%, eg under short circuit conditions, the amplifier 194 will go into saturation, ie at an output voltage of about 4 V. Thus, the circuit 130 will not be able to discriminate between heavy overloads and short circuit.

In order to provide for rapid tripping of the circuit breaker in the feeder 11 under short circuit conditions, the short circuit detector 146 is arranged to detect when the duty cycle falls to zero. This will happen at the point at which the curve 62 selected on the attenuator 126.1 or 126.2 intersects the y-co-ordinate in the graph of FIG. 3. This takes place as follows. The square wave output of the circuit 232 is fed to the decade counter 326 which will attempt to advance one count for each cycle of the square wave. However, its reset terminal R receives pulses from the output 200 of the amplifier 242, and for as long as the duty cycle is between 0 and 100% the counter 326 will be reset each cycle. But when the duty cycle falls to zero, the pulses on the output 200 will disappear. The counter 326 will then rapidly count to 'nine' so that the output of its pin 11 will go from a negative value to a high value. At a frequency of 1.2 Hz this will take place within a fraction of a second. The voltage on the pin 11 is then fed to the latching circuit 158 via the OR-gate 152 to cause tripping of the circuit breaker. Because the decade counter 326 has to receive nine pulses uninterruptedly before causing tripping, it will effectively prevent the device from tripping spuriously due to noise or transient conditions.

Whereas the overload discriminator 40 in the device 10 is connected to the output of the subtracting circuit 26, the overload discriminator 168 of the device 100 is connected to the output of the variable feedback amplifier 120. As the discriminators 40, 168 are merely polarity detectors, this does not make any real difference. The overload discriminator 168 is arranged as a Schmitt trigger to provide positive switching when the load current is at or close to its full load value.

In the start signal discriminator 178 the amplifier 312 is arranged such that when the load current (a representative value of which is obtained via the connection 184) increases sufficiently rapidly beyond 20% of its full load value (ie representing 40 mV for a full load representative voltage of 200 mV) a setting pulse is fed via the capacitor 316 to the circuit 310, causing its output (pin 3) to go high. This will switch the attenuator 126.1, say, for the start curve into circuit. At the same time the pin 6 is freed to go positive. However, if the load current continues to rise to above its full load value, the voltage on the connection 182 will go low so that a capacitor 320.1 of the R-C circuit 320 will remain substantially uncharged. However, if the load current remains below its full load value or subsequently drops below its full load value, the voltage on the connection 182 will go high, charge the capacitor 320.1 so that after a time delay of about 300 ms the circuit 310 will be reset and its pin 3 go low. This causes the adjustable attenuator 126.1 to be switched out of circuit and the adjustable attenuator 126.2 for the run curve to be switched into circuit.

When, during normal conditions, the negative input of the amplifier 274 is switched to the negative rail, the diode 278 will tie the output of the amplifier to zero potential. When, during overload conditions, the negative input of the amplifier 274 is switched to the output of the amplifier 194, the amplifier 274 will start integrating, so that its output voltage will fall from zero to a negative value at a rate depending on the output voltage of the amplifier 194. With the '9' terminal of the decade counter 326 at a negative value, the positive input connection 156 of the OR-gate 152 will be held at about −3 V. Thus, as soon as the voltage on the negative input connection 154 drops to less than −3 V, the output of the OR-gate will go high. The time taken for the voltage to drop to this level will be inversely proportional to the output voltage of the amplifier 194, giving a hyperbolic relationship.

As soon as the output of the OR-gate 152 goes high, the latching circuit 178 will operate to switch off the transistor 294. This de-energises the relay 162 causing its tripping contacts to operate so as to cause tripping of the circuit breaker in the feeder 11.

As the relay 162 is energised during normal load conditions, the device 100 will fail to safety. After it has tripped, the device 100 may be reset by pushing the reset button 300.

In order to facilitate selection of the appropriate setting of the attenuator 126.1 for the start curve, a specially calibrated voltmeter may be used, which is connectable between the negative rail and the output of the amplifier 194. The voltmeter may conveniently be calibrated in seconds so as to give a direct indication of tripping time for a particular voltage on the output of the amplifier 194. Thus, when setting up the device 100, the load 14 is switched on and the voltmeter observed. Immediately after switch on, while the load current is still at its maximum value, the attenuator 126.1 is adjusted so as to give the desired time reading, eg 20 seconds. This will mean that, at that setting, the device 100 will trip after 20 seconds if the starting current is maintained for longer than this time.

The protection relays described with reference to the illustrated embodiments have the advantage that they can be set accurately to discriminate at long time delay settings up to 100 seconds as well as at short time delay settings. In conventional protection relays having time delay characteristics of the hyperbolic type, accurate discrimination at high and low load currents is difficult due to the very large and small slopes at such currents, respectively, of the time delay characteristic. The protection relays described have the further advantage that they are automatically switched to a less sensitive mode during start-up conditions and automatically revert to the normal run mode when the starting current surge has subsided.

What we claim is:

1. A method of monitoring an input signal, which comprises dividing a predetermined dividend value by the input signal to provide a quotient signal, integrating the quotient signal with respect to time to provide an integrated signal, and generating an output signal when the integrated signal reaches a predetermined value.

2. A method as claimed in claim 1, for protecting electrical equipment, wherein said input signal is representative of the degree by which the current flowing in the equipment exceeds a predetermined full load value, and wherein said output signal is caused to trip the electrical equipment.

3. A monitoring device for monitoring an input signal, which comprises timing means operative in response to an intermediate signal to generate an output signal at the end of a time delay whereof the length depends non-linearly on the magnitude of the intermediate signal during the time delay, and correcting means operative in response to the input signal to provide said intermediate signal to the timing means, the correcting means having a transfer characteristic which is such that the length of the time delay depends substantially linearly on the magnitude of the input signal during the time delay over at least a finite range of magnitudes of the input signal, the higher the magnitude of the input signal, the shorter the time delay.

4. A monitoring device for monitoring an input signal, which comprises dividing means for dividing a predetermined dividend value by the input signal to provide a quotient signal, an integrator for integrating the quotient signal with respect to time to provide an integrated signal, and timing means operative in response to the integrated signal to generate an output signal when the integrated signal reaches a predetermined value.

5. A monitoring device as claimed in claim 4, wherein the dividing means comprises a triangular wave generator for generating a triangular wave signal, a comparator for comparing the triangular wave signal with said input signal, and a feedback amplifier having a feedback loop and being operative to amplify said dividend value to provide said quotient signal, the feedback loop having switching means operative in response to the comparator to switch the feedback loop into or out of circuit depending on whether the instantaneous value of the triangular wave signal respectively exceeds or is less than the input signal by a pedetermined amount.

6. A monitoring device as claimed in claim 5, wherein the switching means is in the form of a solid state analogue switch.

7. A monitoring device as claimed in claim 5, which further comprises detecting means for detecting when the instantaneous value of the triangular wave signal respectively exceeds or is less than the input signal by said predetermined amount for at least a whole cycle of the triangular wave signal, the detecting means being operatively connected to the means for generating said output signal, thereby, in response to such occurrence, to cause the generation of said output signal.

8. A monitoring device as claimed in claim 7, wherein the detecting means comprises a counting circuit which is operatively connected to the triangular wave generator for being advanced one count for every cycle of the triangular wave generator, and which is further operatively connected to the output of the comparator for being reset whenever the instantaneous value of the triangular wave signal respectively exceeds or is less than the input signal by said predetermined amount, whereby, when the counter reaches a predetermined count of at least two, the means for generating said output signal is caused to generate said output signal.

9. A protection relay for protecting electrical equipment, which comprises means for providing an input signal representative of the degree by which the current flowing in the equipment exceeds a predetermined full load value, dividing means for dividing a predetermined dividend value by the input signal to provide a quotient signal, an integrator for integrating the quotient signal with respect to time, and timing means operative in response to the integrated signal to generate an output signal when the integrated signal reaches a predetermined value, whereby, in operation, the output signal is capable of being used for tripping said equipment.

10. A protection relay as claimed in claim 9, wherein the means for providing said input signal includes a high precision rectifier to provide said input signal as a DC signal where said current is an AC current.

11. A method of protecting electrical equipment wherein the current during start up, when the equipment operates in a start up mode, exceeds a predetermined full load value and thereafter drops to a value equal to or less than the predetermined full load value when the equipment operates in a running mode, which method comprises:
obtaining an input signal representative of the degree by which the current exceeds the predetermined full load value;
providing switchable time delay means being switchable between a starting condition and a running condition;
feeding the input signal to the switchable time delay means, the switchable time delay means being operative in each of its said conditions to generate an output signal at the end of a time delay whereof the length depends on the magnitude of the input signal during the time delay, the time delay when the switchable time delay means is in the starting condition being longer than that when it is in the running condition for the same input signal;
sensing whether the equipment operates in the start up or in the running mode;
automatically switching the switchable time delay means to its starting or running condition according to whether the equipment operates in the start up or running mode respectively; and
causing said output signal to trip the equipment.

12. A protection relay for protecting electrical equipment wherein the current during start up, when the equipment operates in a start up mode, exceeds a predetermined full load value and thereafter drops to a value equal to or less than the predetermined full load value, which comprises:
means for providing an input signal representative of the degree by which the current flowing in the equipment exceeds the predetermined full load value;
switchable time delay means operatively connected to the means for providing said input signal and being switchable between a starting condition and a running condition in each of which conditions it is adapted in response to the input signal to generate an output signal capable of being used for tripping said equipment, said output signal being generated at the end of a time delay whereof the length depends on the magnitude of the input signal during the time delay, the time delay when the switchable time delay means is in the starting condition being longer than that when it is in the running condition for the same input signal;
sensing means for sensing whether the equipment operates in the start up or in the running mode; and
means operatively connected to the sensing means for automatically switching the switchable time delay means to its starting or running condition according to whether the equipment operates in the start up or running mode respectively.

13. A protection relay as claimed in claim 12, wherein said switchable time delay means includes a pair of adjustable attenuators, and switching means for selectively connecting one of the adjustable attenuators, according to whether the equipment operates in the start up or running mode, in circuit to attenuate said input signal.

14. A protection relay as claimed in claim 13, wherein the switching means is in the form of a pair of solid state analogue switches, each associated with one of the attenuators.

15. A protection relay as claimed in claim 13, wherein the switchable time delay means includes dividing means for dividing a predetermined dividend value by the input signal to provide a quotient signal, an integrator for integrating the quotient signal with respect to time to provide an integrated signal, and timing means operative in response to the integrated signal to generate said output signal when the integrated signal reaches a predetermined value, the switching means being operative selectively to connect one of the attenuators between the means for providing said input signal and the dividing means.

16. A protection relay as claimed in claim 12, wherein said switchable time delay means includes an amplifier connected to the means for providing said input signal, a pair of adjustable attenuators, and switching means for selectively switching one of the attenuators in circuit as feedback element for the amplifier according to whether the equipment operates in the start up or running mode.

17. A protection relay as claimed in claim 16, wherein the switching means is in the form of a pair of solid state analogue switches, each associated with one of the attenuators.

18. A protection relay as claimed in claim 16, wherein the switchable time delay means further includes dividing means operatively connected to the output of the amplifier for dividing a predetermined dividend value by the output of the amplifier to provide a quotient signal, an integrator for integrating the quotient signal with respect to time to provide an integrated signal, and timing means operative in response to the integrated signal to generate said output signal when the integrated signal reaches a predetermined value.

* * * * *